May 22, 1928.

J. J. KANE 1,671,077

SYSTEM OF DISTRIBUTION

Filed July 24, 1915  2 Sheets-Sheet 1

May 22, 1928.
J. J. KANE
1,671,077
SYSTEM OF DISTRIBUTION
Filed July 24, 1915
2 Sheets-Sheet 2
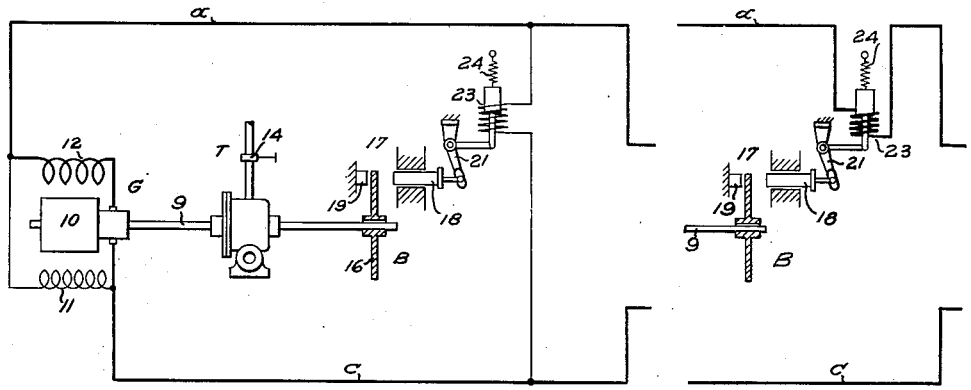
Fig. 4
Fig. 5
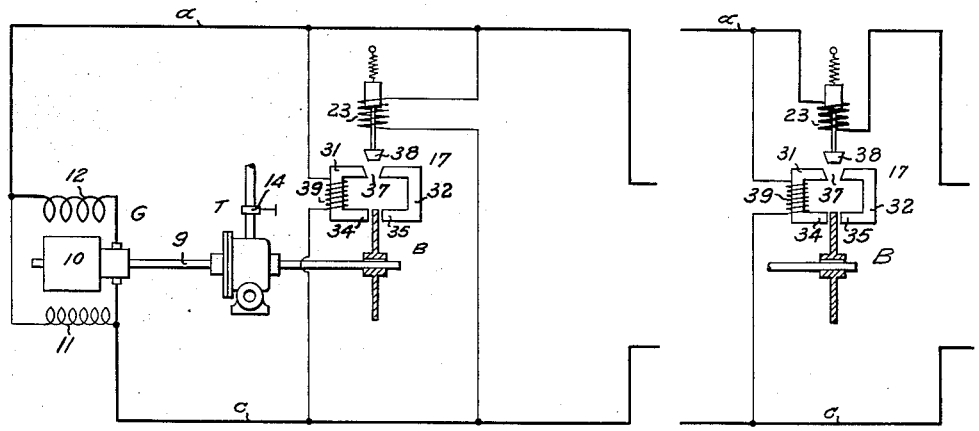
Fig. 6
Fig. 7
Inventor
J. J. Kane
by
Attorney Patented May 22, 1928.

1,671,077

UNITED STATES PATENT OFFICE.

JOHN J. KANE, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

SYSTEM OF DISTRIBUTION.

Application filed July 24, 1915. Serial No. 42,104.

This invention relates in general to electrical distribution systems, and has particular relation to devices for regulating generators connected to supply variable loads, especially where there is a tendency for a generator to operate at widely different speeds.

In certain installations, as where a steam turbine drives a generator, usually through a direct connection therewith, for supplying a variable load, as for supplying lamps on a locomotive, such as the head-light and the cab-lights, some means are necessary to limit the speed of the turbine on the loss of a portion of the generator load or an increase of the steam pressure at the turbine inlet. It will be obvious that, if the generator were permitted to operate at an increased speed, when a portion of its normal load is removed or the inlet pressure is increased, unless the generator field be regulated to maintain the voltage at the proper point, the voltage on the translating devices constituting the load would rise to a dangerously high value, and this is especially the case where the load comprises lamps of the incandescent type where a voltage variation of less than 10 per cent is injurious to the life of the lamps.

In accordance with this invention, improved means are provided for regulating the output of a generator, the general operating effect of the regulating means provided being to maintain a characteristic of the energy supplied by the generator substantially constant independently of the speed thereof and to provide for this purpose an artificial load which takes the place of that portion of the lamp load removed from circuit or compensates for an increase in pressure of the working fluid that operates the generator-driving means, and acts to control the speed of such generator-driving means. This regulation may be effected in response to voltage or current, that is, slight changes in these energy characteristics may be effective to check great ones, in any case, the final regulation functioning to maintain approximately constant, or within permissible limits, the desired energy characteristic.

It is an object of this invention to provide a system of distribution comprising a generator driven by fluid-operated means which inherently functions to increase its speed on loss of load or increase in pressure of the working fluid and supplying a load of a variable character, an improved means for maintaining a characteristic of the energy supplied by said generator within desired limits independently of the load thereon or the pressure or other variable characteristic of the working fluid operating the generator-driving means.

It is a further object of this invention to provide an improved regulating apparatus for a system of distribution, comprising a retarding device that acts as an artificial load on the generator-driving means.

It is a further object of this invention to provide an improved regulating device for the system described, comprising a retarding device forming an artificial load on the generator-driving means, in combination with means automatically operative in response to an operating characteristic of the generator for rendering the retarding or braking device operative or inoperative and comprising a dynamo-electric power device regulable to cause an armature member thereof to be cut by a variable amount of magnetic flux.

These and other objects are obtained by this invention, the various novel features of which will appear from the description and drawings, disclosing embodiments of such invention, and will be particularly pointed out in the claims.

In the accompanying drawings:

Figs. 4, 5, 6 and 7 show modifications of the invention.

Figure 1:
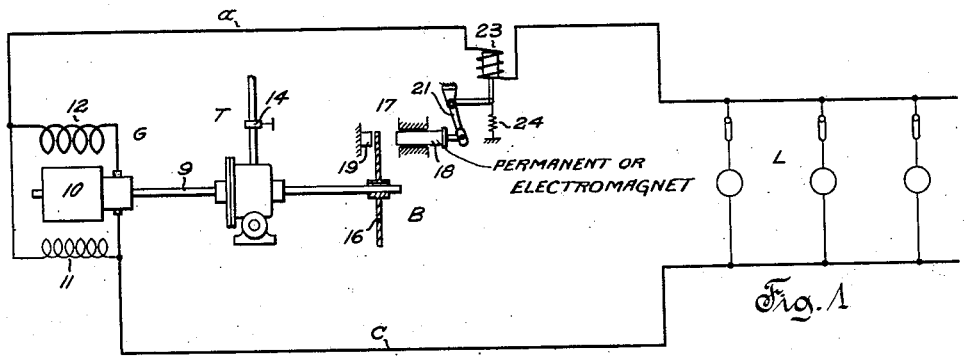
Fig. 1 is a diagrammatic view of a system embodying features of this invention.

In accordance with the drawings a generator G, shown diagrammatically, is driven by a prime mover, such as a turbine T, being preferably mounted on the same shaft 9 therewith. The armature of the generator is indicated at 10, the shunt field at 11, and the series field at 12, the machine terminals being properly connected to the distribution circuit $a$, $c$. The turbine T is provided with an inlet 14 of adjustable size, although, in the ordinary operation of the system, the inlet opening remains constant when once adjusted, this adjustment depending on the normal generator speed desired and the normal working pressure on the turbine inlet.

A braking device B is provided to act as an artificial load on the turbine. This brake comprises a disk 16 of conductive material mounted to rotate with the shaft 9 and in a magnetic field produced by the field element 17, the rotation of the disk being opposed by a force that varies in the same sense as the strength of the magnetic field which the disks cuts. As here shown, the field element comprises a member 18 of magnetic material, preferably a permanent magnet, which is movable into close proximity to and away from the conducting disk 16. When this field member 18 is adjacent the conducting disk, the magnetic flux through the conducting disk is a maximum, and, hence, the retarding action of the disk on the turbine shaft 9 is also a maximum. When the member 18 is in retracted position, there is comparatively little or no flux passing through the conducting disk, and, hence, the retarding action of the same on the turbine shaft 9 is a minimum. A field member 19, preferably of soft iron, is disposed in fixed position and in axial alignment with the movable member 18, this member 19 serving, when the member 18 is in position adjacent the disk 16, to concentrate or direct the flux produced by the member 18 so that a maximum portion thereof is cut by the disk 16 to cause maximum braking effect of the disk on the turbine shaft. While the member 18 is described as being a permanent magnet, it will be apparent that the same may be provided with an energizing winding. Connected to an extension of the member 18 is a bell-crank lever 21 pivoted to a fixed point and having an arm connected to an extension of the core of an electromagnet 23, the winding of which is adapted to be energized by a coil in series with the distribution circuit $a$, $c$. When energized to a predetermined extent, this magnet is effective to hold the movable field member 18 in retracted position against the action of a spring 24 which tends to move such member into a position adjacent the disk 16.

The distribution circuit $a$, $c$ supplies a plurality of load elements, such as lamps L, the load being generally described as being of a variable nature.

During conditions of normal load on the generator G and normal pressure at the inlet of the steam turbine T, which may be assumed, the inlet being adjusted to the proper opening, the magnet 23 is sufficiently energized to hold the movable field member 18 away from the conducting disk 16, against the action of the spring 24. With the parts in this position, it will be apparent that there is little or no braking effort exerted by disk 16 on the turbine shaft. When the load on the generator is decreased, as by the cutting out of one or more lamps L, the current through the energizing winding of the magnet 23 is appreciably decreased and the spring 24 overcomes the attractive force of the magnet 23, the member 18 being moved into position adjacent the disk 16, some device being provided for limiting the movement of the member 18, such as a shoulder or collar for engagement with a fixed abutment, toward the disk so as to insure an appreciable gap between the disk and the adjacent polar face of the member 18. At this time the disk 16 is subjected to the passage therethrough of a maximum amount of magnetic flux and, accordingly, the disk exerts its maximum braking effect on the turbine shaft 9 to hold down the speed thereof and, likewise, the voltage at the generator terminals and on the distribution circuit $a$, $c$. The voltage on the load elements is thus held within a predetermined limit in spite of the fact that the generator load has been reduced. On an increase of load, the increased current through the winding of the magnet 23 is effective to overcome the spring 24 and return the field element 18 to retracted position, relieving the turbine of the additional load produced by the disk 16.

With the electromagnet 23 and the brake B so designed that the brake is thrown in as an additional load on the turbine when the voltage on the translating devices L, remaining in circuit upon the removal of one or more devices from circuit, reaches a limiting high value, it will be apparent that, due to the fact that the series field winding on the generator may be depended upon as an assisting voltage-regulating feature, holding down the voltage to some extent as the load goes off, an appreciable amount of the normal generator load may be removed without exceeding a permissible voltage, before the brake is thrown in as an artificial load on the turbine. The brake may be of such design that, with the remaining translating device or devices in circuit, the generator speed is not reduced beyond a point which results in a permissible voltage on any of such translating devices.

Figure 2:
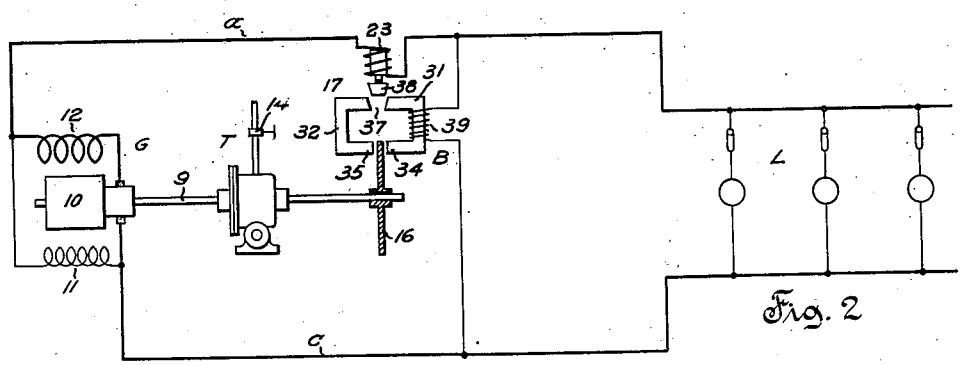
Figs. 2 and 3 are diagrammatic views of systems embodying modifications of the form of invention shown in Fig. 1.

In the system disclosed in Fig. 2, the field element 17 of the braking device B is shown as comprising two separate members of magnetic material 31 and 32 provided with aligned and spaced polar portions 34 and 35, respectively, between which the disk 16 is adapted to rotate, the gap between the polar portions being preferably of fixed dimensions. At another point, the ends of the field elements 31 and 32 are spaced apart to provide a gap 37 which is adapted to be occupied by a block or plunger of magnetic material 38 effective to so reduce the gap as to produce substantially the effect of a single member of magnetic material. The field element 17 is preferably provided with an energizing winding 39 connected across the sides of the distribution circuit $a$, $c$. The energizing winding of the magnet 23 is in series with the distribution circuit $a$, $c$ and is effective under normal load conditions to hold the magnetic member 38 withdrawn from the gap 37 between the field elements 31 and 32.

In the operation of the system of Fig. 2, when a portion of the generator load is removed, as by cutting out one or more lamps L from circuit, the weight of the core and plunger 38, and, if necessary, through the assistance of a spring, causes movement of the plunger 38 to a position wherein it bridges the gap between the elements 31 and 32, thus decreasing the reluctance of the field 17 to such an extent that a sufficient amount of flux passes through the disk 16 to cause the latter to exercise an appreciable braking effect on the turbine shaft 9. This braking action of the disk 16 on the turbine shaft continues while the load is below normal and the energization of the magnet 23, due to the reduced current in the circuit $a$, $c$, is insufficient to withdraw the plunger 38 from the gap 37 in the magnetic field 17. When the load again becomes normal, the winding of the magnet 23 is sufficiently energized to withdraw the plunger 38, and the disk 16 exercises no appreciable braking effect on the shaft 9.

The system of Fig. 1 and that of Fig. 2, with the action of the electromagnet 23 changed so that the movable field element is in withdrawn position under normal load conditions and is moved to such position as to produce maximum flux through the disk 16 on increase in current in the circuit $a$, $c$ above normal, as shown in Figs. 5 and 7 respectively, may operate, with the several load elements permanently connected in circuit, to maintain constant voltage or current in the system independently of variations in pressure at the turbine inlet.

The systems in Figs. 1 and 2 may be modified to the extent that the energizing winding of the electromagnet 23 may be rendered directly voltage responsive instead of current responsive, the core of the magnet being in unattracted position when the load on the circuit $a$, $c$, is normal, as shown in Figs. 4 and 6 respectively, and, due to the effect of increased voltage resulting from the removal of one or more load elements from circuit or increased pressure at the turbine inlet, operating to actuate the movable field element to the position wherein maximum magnetic flux is cut by the disk 16.

Figure 3:
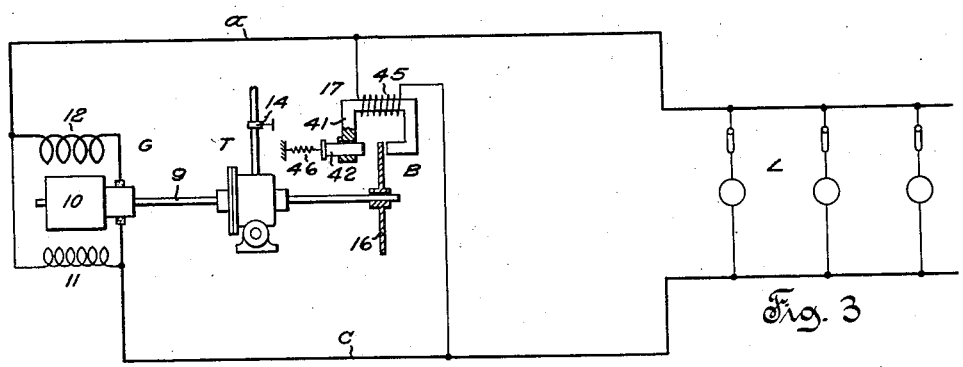

In the system disclosed in Fig. 3, the field element 17 of the braking device B is made up of two relatively movable parts 41 and 42, the latter being preferably in the form of a plunger movable with a comparatively close fit through an opening in the former part. The part 42 is normally held away from the disk 16 by a spring 46. A winding 45, shown as being connected across the sides of the distribution circuit $a$, $c$, is effective to create a flux in the field element of the brake which flux varies as the voltage across the generator terminals. Under certain conditions, the flux created is sufficient to overcome the effect of the spring 46 and to draw the movable part 42 of the field toward the polar portion of the fixed part 41 to reduce the gap in which the disk 16 operates, at which time the flux through the disk 16 approaches its maximum and is effective to cause the disk to act as an appreciable artificial load on the turbine.

Under normal conditions of load on the generator G, in the system of Fig. 3, the voltage across the generator terminals and, accordingly, the energization of the field 17 due to the winding 45, does not cause the disk 16 to have any appreciable effect as a brake. However, when the load on the generator drops off, as by cutting one or more lamps L out of circuit, or when the pressure at the turbine inlet increases above normal, the voltage at the generator terminals and across the winding 45, due to the increased generator speed, may be sufficient to energize the field 17 to such an extent that the movable part 42 of the field is drawn up to its limit toward the polar portion of the fixed part 41, against the action of the spring 46, to reduce to a minimum the air gap in which the disk 16 operates, at which time this disk exercises a maximum braking effect on the turbine shaft 9. By proper design of the winding 45 and selection of the spring 46 it will be apparent that the plunger 42 may be caused to move to just such an extent as is necessary to produce the amount of flux required to cause the disk 16 to act as the necessary artificial load on the turbine which causes the voltage on the load elements to be held within the desired limits. It will be obvious that when the load again increases or the pressure at the turbine inlet decreases, the energization of the field 17, due to the winding 45, is decreased to permit retraction of the plunger element 42 and the consequent cessation of braking effect of the disk 16.

It will be obvious that the brake device of any of the various systems disclosed may be so designed that, when operating as an artificial load on the turbine shaft, it undercompensates for changes in voltage, that is, the brake is permanently effective while the load or inlet pressure is abnormal; or the brake may be so designed that the same overcompensates for changes, that is, the momentary effect of the same on the turbine shaft is to cause such decrease in the voltage as causes the brake to be immediately rendered effective, in this case, the voltage pulsating between permissable limits to maintain a desirable average during conditions of abnormal load on the generator or pressure at the turbine inlet.

Again, the brake and the electromagnetic devices for rendering the same effective may be so designed that the force which acts to render the brake effective as a load on the turbine shaft may vary in the same sense as the voltage on the line $a$, $c$, that is, between its permissible limits this resulting in the brake acting as a variable load, due to the fact that the disk 16 is then operating in a field of variable intensity.

It will be apparent that, as more particularly described in connection with Fig. 3, the electromagnetic field element of the brake of any of the systems disclosed may be so designed, particularly as to its adjustable portion and energizing windings and the biasing means for the movable portion, whether such biasing means be gravity, friction, springs, or a combination of these elements, as to secure any desired refinement in the matter of having the effective flux through the conductive disk and, hence, the consequent braking effect, begin to make itself felt at any desired load value, and in the matter of making this flux and the consequent braking effect variable and fully responsive to the various changes in the load on the generator between the load value at which appreciable braking action is actuated and full load, to the end that the voltage of the system may be maintained as nearly absolutely constant as desired over the full range of load variation or any desired range thereof from full load downward.

It will be apparent that, in accordance with this invention, a system of distribution is provided wherein a braking device is rendered effective to act as an artificial load on the generator-driving means, which causes the voltage or current of the system to be maintained substantially constant independently of variations in load on the generator or variations in the pressure or other characteristic of the working fluid operating the generator-driving means.

It should be understood that it is not desired that the invention claimed, be limited to the exact details of construction shown and described, for obvious modifications will occur to a person skilled in the art.

It is claimed and desired to secure by Letters Patent:

1. A generator connected to supply a variable load, a brake for said generator comprising an element of conductive material mechanically connected for operation with said generator, and a field element for creating a magnetic field in which said element is rotatable, said field element comprising a part movable to vary the intensity of said magnetic field, and automatically operative means operable in response to variations in load for actuating said movable element to vary the effect of said brake on said generator.

2. In combination, a generator, a brake associated with said generator and comprising field and armature elements, and means responsive to variations in load on said generator for causing relative movement between said armature element and a portion of said field element to thereby vary the effect of said brake on said generator.

3. A generator connected to supply a variable load, and a brake for said generator comprising relatively movable parts one of which exerts an electromagnetic influence upon another, and one of said parts comprising relatively movable portions at least one of which is automatically adjustable in response to an operating characteristic of said generator for varying the degree of said electromagnetic influence.

4. In combination a dynamo electric machine, a brake associated with said machine comprising a conductive disk and means for producing a magnetic field through said disk, and means responsive to current variations in the circuit of said machine for varying the intensity of said field but producing a substantially constant minimum effect for currents of a predetermined range of values.

5. In a braking device for dynamo-electric machines, a movable member of conductive material, means for producing a magnetic field for braking said member, and means for controlling said field producing means comprising an element connectible to carry current varying in the same sense as current in the circuit of said dynamo-electric machine whereby under certain conditions of operation of said machine minimum braking action is produced and over a predetermined range of values of said current braking effects are produced which are dependent upon the value of the current within said range.

6. In combination, an electric generator, a supply circuit connected thereto, a variable load connected to said supply circuit, and means for maintaining the voltage of said supply circuit substantially constant, said means comprising an electromagnetically-actuated drag for the generator comprising a field element, and an energizing winding therefor, and means for causing the effective magnetic flux in said field element to vary inversely as the load on said supply circuit, said means including an electrically conductive element carrying current proportional to that of said supply circuit and non-inductively related to said field element.

7. In combination, an electric generator, a supply circuit connected thereto, a variable load connected to said supply circuit, and means for maintaining the voltage of the energy supplied to said load within fifty percent of normal or full load value during variation of said load from full load to no load values, said means comprising an electromagnetically-actuated brake operatively associated with said generator and having an energizing winding of the shunt type, and means for controlling the effective braking effort of said brake, said means comprising an electromagnet having a winding independent of the magnetic circuit of said brake and carrying current responsive to a characteristic of the energy of said supply circuit.

8. In combination, an engine, a generator driven thereby, a variable electrical load connected to be supplied by said generator, and electromagnetically actuated means for controlling said generator, said controlling means being under the joint control of the generator voltage and the load current and including instrumentalities for insuring the exertion of a controlling effect in response to said voltage independently of said current while said current is above a predetermined value.

9. In combination, an engine, a generator driven thereby, a variable electrical load adapted to be supplied by said generator, and means for controlling a characteristic of the electrical energy supplied by said generator, said means including electromagnetically-actuated instrumentalities comprising a field element and an armature rotatable relative thereto and responsive to the load on the generator circuit under conditions of normal voltage thereon, and additionally responsive to excess speed of said generator under certain conditions.

10. In combination, an engine, a generator driven thereby and connected to supply a variable load, and means for controlling the speed of said engine, said controlling means comprising electromagnetically-actuated instrumentalities under the joint control of current and voltage in the circuit of said generator under certain operating conditions and responsive to the effect of excess voltage of said generator independently of said current under conditions of light load on said generator.

11. In combination, a magnetic circuit comprising relatively movable portions in series in the normal path through said magnetic circuit, a movable conducting disk disposed in said circuit, means for energizing said circuit, means for altering the magnetic flux conditions of said circuit so that under certain conditions substantially no flux passes through the disk and under other conditions an appreciable flux passes therethrough, said altering means including an electromagnet for causing relative movement of said portions of the magnetic circuit to thereby cause variation in the reluctance of a portion of said magnetic circuit.

12. In a controlling device for an electrical circuit, a rotatable armature of conductive material, and means for causing the production of magnetic flux of a desired character through said armature, said means including a field element having relatively movable portions of magnetic material and polar portions between which said armature is adapted to operate, and an energizing winding for said field element, and means including a winding carrying current varying in accordance with variations in the load on said circuit for causing variation in the reluctance of said magnetic field.

13. In a controlling device for an electrical circuit, a field element of magnetic material, an energizing winding for said field element, a rotatable armature of conductive material cooperative with a polar portion of said field element, and means for causing variation in the controlling effect exerted upon said armature, said means comprising an electromagnetically-actuated device having an energizing winding responsive to the current in said electrical circuit, said latter winding being non-inductively related to said field element.

14. In combination, an electrical power circuit, means for supplying current thereto, and means for exercising a controlling effect upon said power circuit, said controlling means comprising an electromagnetic device having a magnetic circuit, an energizing winding therefor, said magnetic circuit comprising relatively movable portions of magnetic material, a movable element including a portion of conductive material electromagnetically associated with said magnetic circuit and responsive to effects of said energizing winding, and means including a winding carrying current proportional to the current in said power circuit for causing variation in reluctance of the magnetic circuit through said movable parts and consequent variation in the magnetic effect produced on said movable element.

15. In combination, an electrical circuit, means for exercising a controlling effect on said circuit, said means comprising a magnetizable core member including a plurality of relatively movable parts adapted to produce variable reluctance of the magnetic circuit, a winding connected in shunt to said circuit for energizing said core member, a movable armature element responsive to energization of said core, and means responsive to the load on said circuit for causing variation in the reluctance of said magnetic circuit and consequent variation in the torque effect on said movable armature element.

16. In a system of control, an electric generator, a load circuit connected thereto, and means for maintaining the voltage of said generator substantially constant comprising an electromagnetically-operated brake for the generator, said brake including a magnetic field element, and energizing means therefor in the form of a winding connected in shunt to said generator, and means for varying the effective energization of said brake due to said shunt winding, said means comprising an electromagnet having an energizing winding carrying current proportional to the current of the load circuit and non-inductively related to said magnetic field element.

17. In combination, an electrical power circuit, and a device for exercising a controlling effect upon said circuit comprising a magentic field element of variable reluctance and having polar portions, an armature element operatively associated with said polar portions and responsive to the effective flux of said field element, and means for causing the reluctance of said field element to be under the control of the current of said power circuit, and the effective flux through said armature element to be under the joint control of the voltage and current of said power circuit.

18. In combination, an electrical power circuit, means for supplying energy thereto, and a controlling device comprising a magnetic circuit having an air-gap, and a conductive disk subjected to flux across the gap in said magnetic circuit, said controlling device including and being under the joint control of two windings one of which is non-inductively related to said magnetic circuit and carries current responsive to the load on said power circuit.

19. In combination, an electrical power circuit, a source of supply for said power circuit, and means for controlling the electrical energy supplied by said source, said control means comprising a magnetic circuit of variable reluctance, a movable element electromagnetically responsive to the effective flux in a polar portion of said magnetic circuit, and windings in shunt and in series relation to said power circuit, the effective flux in said polar portion being under the joint control of said windings and adapted to cause the exertion of an appreciable force upon said movable element only under conditions of decreased current flow between said source and said power circuit.

20. In combination, an electrical power circuit, a source of supply for said power circuit, and means for exercising a controlling effect upon the energy supplied by said source to said power circuit, said control means comprising a magnetic circuit including relatively movable portions of magnetic material, the main portion of said circuit having an energizing winding in shunt to the terminals of said generator, an energizing winding carrying current proportional to the current in said power circuit and operatively associated with a movable portion of said magnetic circuit to control the movement thereof, said movable portion being movable to a position wherein the reluctance of said magnetic circuit is a minimum in response to a predetermined energization of said current winding.

21. In combination, an electrical circuit of variable load requirements, a source of supply for said circuit, and means for exerting a controlling effect on the energy supplied to said circuit, said means comprising a magnetic field element including relatively movable parts of magnetic material adapted to vary the reluctance of said element, and an angularly movable armature of conductive material subject to the magnetic flux between polar portions of said field element, and means for producing a magnetic flux of a variable character between said polar portions which is dependent upon a characteristic of the energy of said electrical circuit, said means comprising a plurality of energizing windings, one of said windings being responsive to a characteristic of the electrical energy of said load circuit and operative to cause variation in the reluctance of said field element.

22. In combination, an electrical circuit of variable load requirements, a source of supply for said circuit, and means for controlling a characteristic of the energy supplied to said circuit, said means comprising a magnetic field element including relatively movable parts of magnetic material, and an angularly movable armature operatively associated with polar portions of said field element, and windings operatively associated with said controlling means and energized in response to the current and voltage of said load circuit and effective to cause the effective flux through said armature to be dependent upon the current and voltage of said load circuit.

23. In combination, an electric power circuit, means for supplying energy thereto, a controlling device for said power circuit comprising a field element, an armature operatively associated with said field element, and means for energizing said field element, and means for causing variation in the actuating torque applied to said armature, said means comprising an electromagnet having a winding electromagnetically independent of said field element and variably energized in response to a characteristic of the energy of said power circuit.

24. In a system of control, in combination with a fluid operated motor, and a generator driven by said motor, a regulator for maintaining the speed of said motor substantially constant and comprising an electromagnet energized in accordance with a characteristic of the load on said generator, and a part movable by said electromagnet relative to the regulator proper for causing said regulator to exert a regulating effect in accordance with the generator load under certain operating conditions.

25. In combination in a power system, a motor, a regulator for maintaining the speed of said motor substantially constant and comprising an electromagnetic device responsive to the motor speed, and a second electromagnet operable in accordance with the load on the motor, said second electromagnet being operatively associated with the remaining parts of the regulator and causing operation of the regulator in accordance with the motor load under predetermined conditions.

26. In combination, a magnetic circuit including a plurality of relatively movable portions, a movable conducting disk disposed in said circuit between polar portions thereof, means for energizing the circuit, means for altering the magnetic flux conditions in said circuit in response to said energizing means so that under one condition of energization substantially no flux passes through the disk and at another predetermined and variable condition of said energization an appreciable flux passes therethrough, said altering means including means for insuring relative movement between the relatively movable portions of said magnetic circuit.

27. An electrical supply circuit of variable power requirements, and controlling apparatus therefor operative to exert a controlling effect upon said circuit and comprising an electromagnetically operative regulating device including means for energizing said device in accordance with a characteristic of the energy of said circuit, and means for varying the action of said electromagnetic device, said means comprising a second electromagnetically operated device associated with said first electromagnetic device and including energizing means therefor responsive to an abnormal condition of a characteristic of the energy of said electrical circuit.

28. In a regulator system, the combination with a dynamo-electric machine having a regulator associated therewith, said regulator comprising a magnetizable core and an energizing coil, of means controlled by said dynamo-electric machine for varying the flux density of said core.

29. In a regulator system, the combination with a dynamo-electric machine having an armature and a field-magnet winding, of regulating means therefor comprising a magnetizable core, an energizing coil, and means governed from said armature for varying the flux density of said core.

30. In a regulator system, the combination with a dynamo-electric machine having an armature and a field-magnet winding, of regulating means therefor comprising a magnetizable core having an air gap therein, an energizing coil and means operated by said machine and adapted to vary said air gap.

31. In a regulator system, the combination with a dynamo-electric machine having an armature winding and a field-magnet winding, of regulating means therefor comprising a magnetizable core having an air gap therein and an energizing coil therefor, an electromagnet having a movable armature and means controlled thereby for varying said air gap.

In testimony whereof, the signature of the inventor is affixed hereto.

JOHN J. KANE.